US008537013B2

(12) United States Patent
Yeager et al.

(10) Patent No.: US 8,537,013 B2
(45) Date of Patent: Sep. 17, 2013

(54) DISPLAY ASSEMBLY WITH INTERCHANGEABLE HEAD DEVICES

(75) Inventors: Lawrence R. Yeager, Matthews, NC (US); Michael Rapp, Modautal (DE); Dennis D. Belden, Jr., Canton, OH (US)

(73) Assignee: Checkpoint Systems, Inc.

( * ) Notice: Subject to any disclaimer, the term of this patent is extended or adjusted under 35 U.S.C. 154(b) by 388 days.

(21) Appl. No.: 12/885,787

(22) Filed: Sep. 20, 2010

(65) Prior Publication Data
US 2011/0068920 A1    Mar. 24, 2011

Related U.S. Application Data

(60) Provisional application No. 61/245,005, filed on Sep. 23, 2009.

(51) Int. Cl.
*G08B 13/14* (2006.01)
(52) U.S. Cl.
USPC ............. 340/568.8; 340/693.1; 340/506
(58) Field of Classification Search
USPC ......... 340/568.8, 568.3–568.4, 568.1–568.2, 340/572.8, 506, 653, 693.1, 686.1, 571
See application file for complete search history.

(56) References Cited

U.S. PATENT DOCUMENTS

| 4,595,320 | A | * | 6/1986 | Berner et al. ............... 408/182 |
| 5,250,792 | A | * | 10/1993 | Swartz et al. ........... 235/462.47 |
| 6,068,342 | A | * | 5/2000 | Mariani et al. ............ 297/219.1 |
| 6,192,530 | B1 | * | 2/2001 | Dai ............................... 4/623 |
| 6,756,900 | B2 | * | 6/2004 | Leyden et al. ............. 340/568.4 |
| 7,236,243 | B2 | * | 6/2007 | Beecroft et al. ............ 356/328 |
| 7,327,276 | B1 | | 2/2008 | Deconinck et al. |
| 2007/0164860 | A1 | | 7/2007 | Marsilio et al. |
| 2008/0169923 | A1 | * | 7/2008 | Belden et al. ............. 340/568.3 |

* cited by examiner

*Primary Examiner* — Daniel Previl

(57) ABSTRACT

Methods and other embodiments associated with a display stand with interchangeable head devices are presented. In one embodiment, a display assembly comprises a base, an interchangeable head device, a mounting member, a tether, and a sensor. The interchangeable head device is mounted to the base. The interchangeable head device is one of a plurality of different base head devices configured to be interchangeably mounted to the base. The mounting member is adapted for mounting thereon a display item and is movable between a mounted position in contact with one of the base head devices mounted to the base. The mounting can be removed from the base to facilitate viewing and handling of the display item. The tether is attached to the mounting member. The sensor transmits a signal to an alarm system when the mounting member is removed from the base head device mounted to the base.

18 Claims, 17 Drawing Sheets

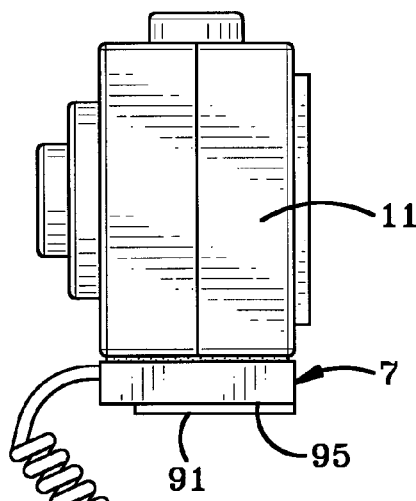
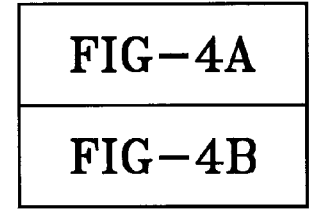
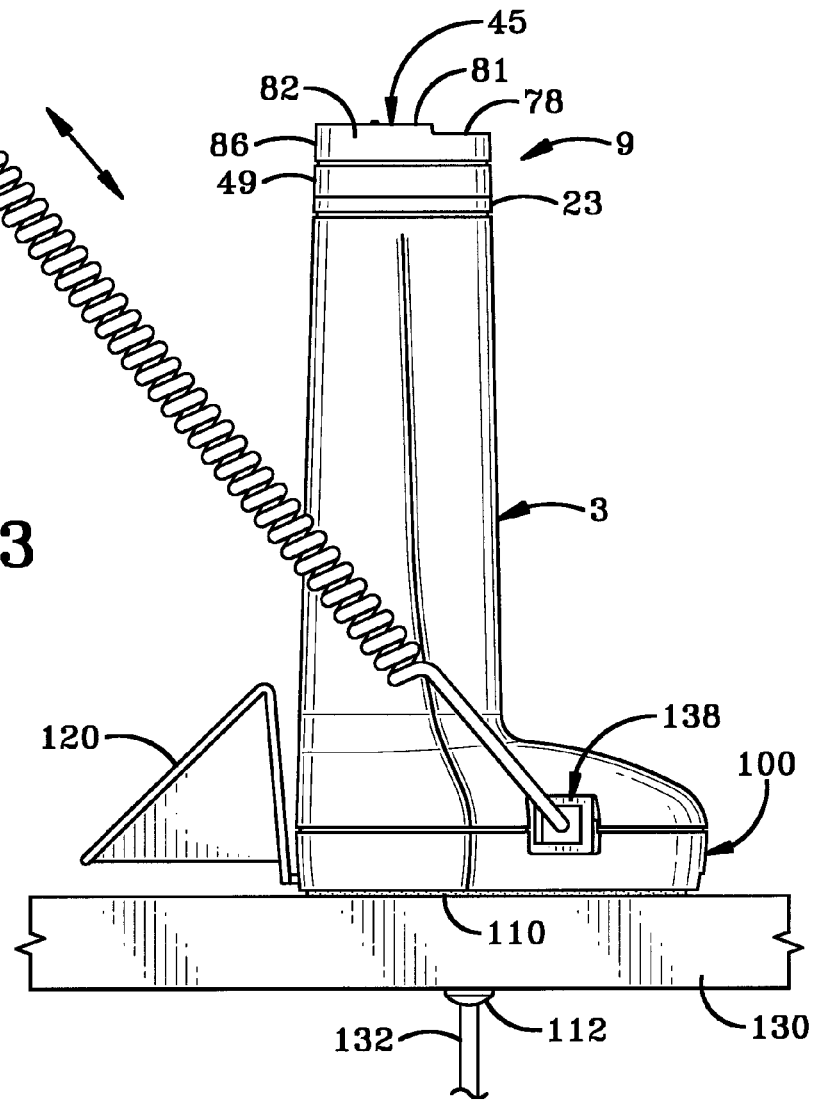
FIG-3
FIG-4

DISPLAY ASSEMBLY WITH INTERCHANGEABLE HEAD DEVICES

CROSS REFERENCE TO RELATED APPLICATIONS

This application claims priority from U.S. Provisional Application Ser. No. 61/245,005 filed Sep. 23, 2009; the disclosure of which is incorporated herein by reference.

BACKGROUND OF THE INVENTION

1. Technical Field

This invention relates generally to display stands for merchandise. More particularly, the invention relates to a display stand which allows the handling of an item of merchandise. Specifically, the invention relates to a display stand that tethers an item of merchandise to the display stand with a tether that will sound an alarm if the tether is cut.

2. Background Information

Retail stores have a difficult time protecting boxes containing various merchandise and other similarly structured packages, or protecting such containers from being opened and the contents thereof being removed without authorization from store personnel or from being damaged while on display. Consumers often want to visually inspect the packaged expensive articles before deciding to purchase them. The store is faced with the problem of how to protect these expensive articles from theft while displaying them for sale.

One method used to protect these packages and the articles contained therein is to enclose the article within a transparent glass display case which can only be accessed by an authorized clerk. The consumer can view the article through the glass but is not able to handle the article or read any of the information about the article that may be printed on the box unless a store clerk removes the article from the case. However, in large retail stores, the problem then arises of getting the selected merchandise to the customer after the customer wishes to purchase the same without subjecting the merchandise to theft. One manner is to maintain a supply of the boxes containing the expensive articles or merchandise close at hand for delivery to or pick-up by the customer for subsequent taking to a check-out clerk. However this makes the boxes susceptible to theft and requires additional sales personnel.

Another method used by retail stores is to list the article in a catalog and require consumers to place an order from the catalog. The article is delivered from a back storage area and the consumer must simultaneously pick up and pay for the merchandise at the same location to prevent unauthorized removal from the store. The consumer has no chance to inspect the merchandise before purchasing and if they are not satisfied they must undergo the inconvenience of returning the merchandise for a refund.

Some locking devices have adequately solved this problem of securing packages or objects in a closed condition while being displayed in retail stores or shipped from one location to another. Some of these devices include a wire which wraps around an article and is secured by some type of locking mechanism. Cable wrap security devices may require a special tool to operate the latch mechanism, both for tightening the cable about the object to be protected and to retract the security cable into the device after the security device has been removed from the package. Also, some require a mechanism to enable the internal spool on which the cable is wound to be free-wheeling in order for the cable to be pulled outwardly to a larger size for placement around another package.

Also, these devices usually require that the cable be manually rewound onto the spool for storage once the security device has been removed from the package. This requires additional work by the retail personnel, and if the cables are not properly rewound these cables will become tangled with other cables creating a storage problem and requiring additional work for reuse and replacement on a different package. A better way of protecting merchandise may be desired.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example embodiments and other example methods of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3 illustrates another side view of a display assembly with interchangeable head devices.

DETAILED DESCRIPTION

Figure 1:
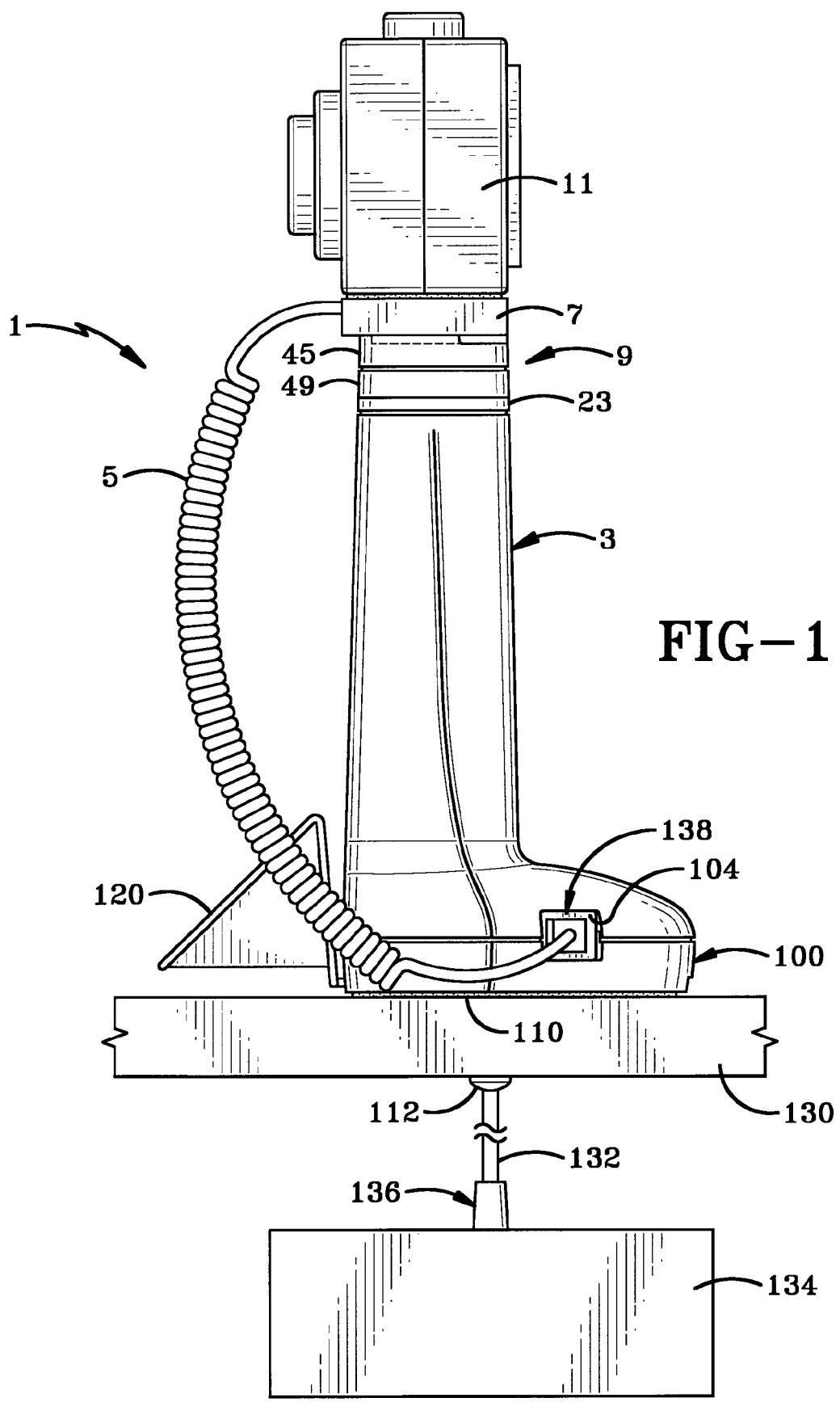
FIG. 1 illustrates a side view of a display assembly with interchangeable head devices.
Figure 2:
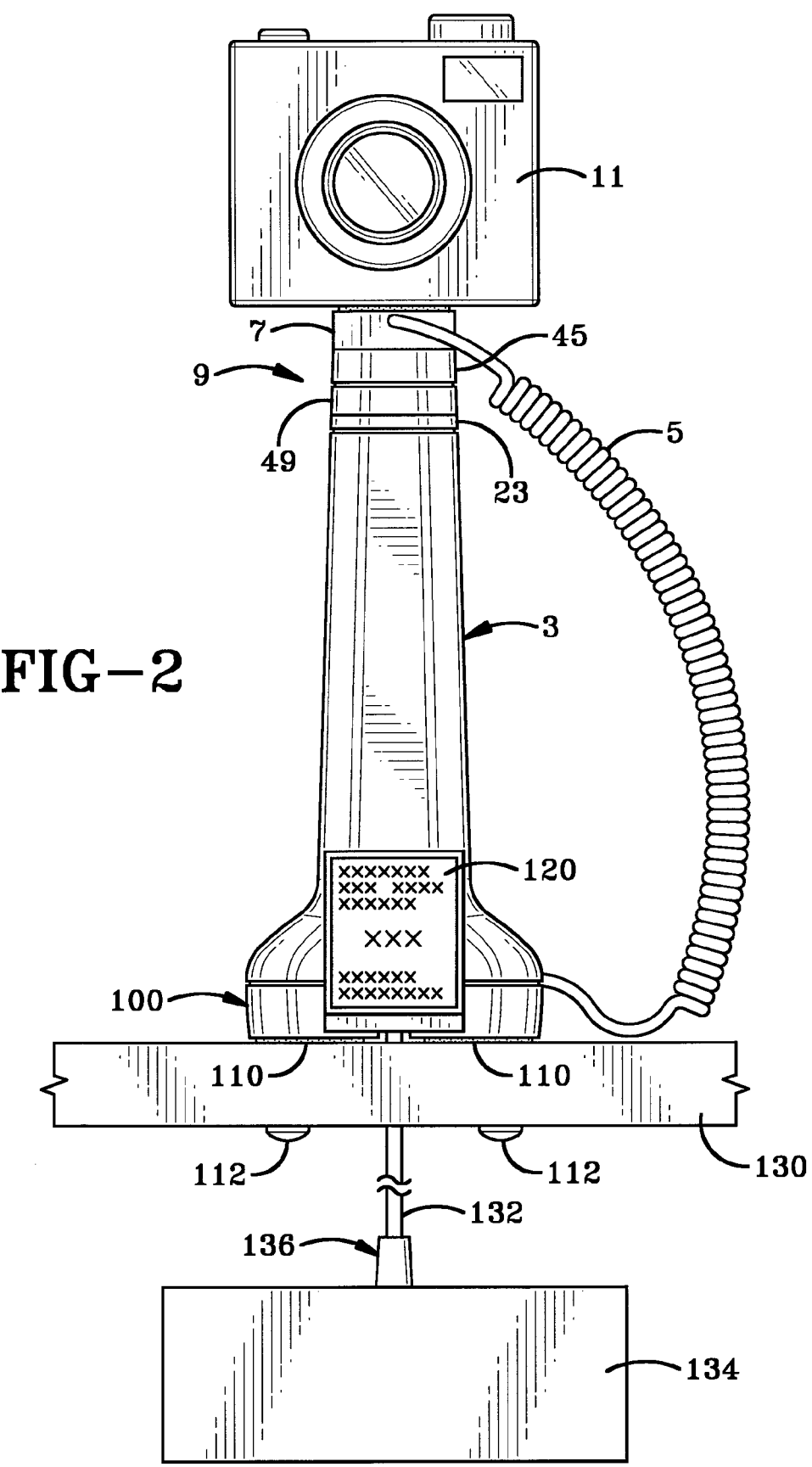
FIG. 2 illustrates a front view of a display assembly with interchangeable head devices.

Described herein are example methods and other embodiments associated with securely displaying consumer merchandise. Referring to FIGS. 1 and 2, in a first embodiment, a display assembly 1 includes a base 3, a tether 5, a mounting member 7, and an interchangeable head device 9. A display item 11 may be securely attached to the mounting member 7. The display item 11 may be a consumer electronic device such as a digital camera or other electronic device. The tether 5 is connected between the mounting member 7 and a bottom portion of the base 3. As shown in FIG. 3, this connection allows a consumer to remove the display item 11 securely attached to the base 3 and allows the consumer to view and touch the display item 11. For example, the consumer may press buttons and explore different features of a video camera mounted to the mounting member 7 while moving the video camera in an area permitted by the tether 5.

Figure 11:
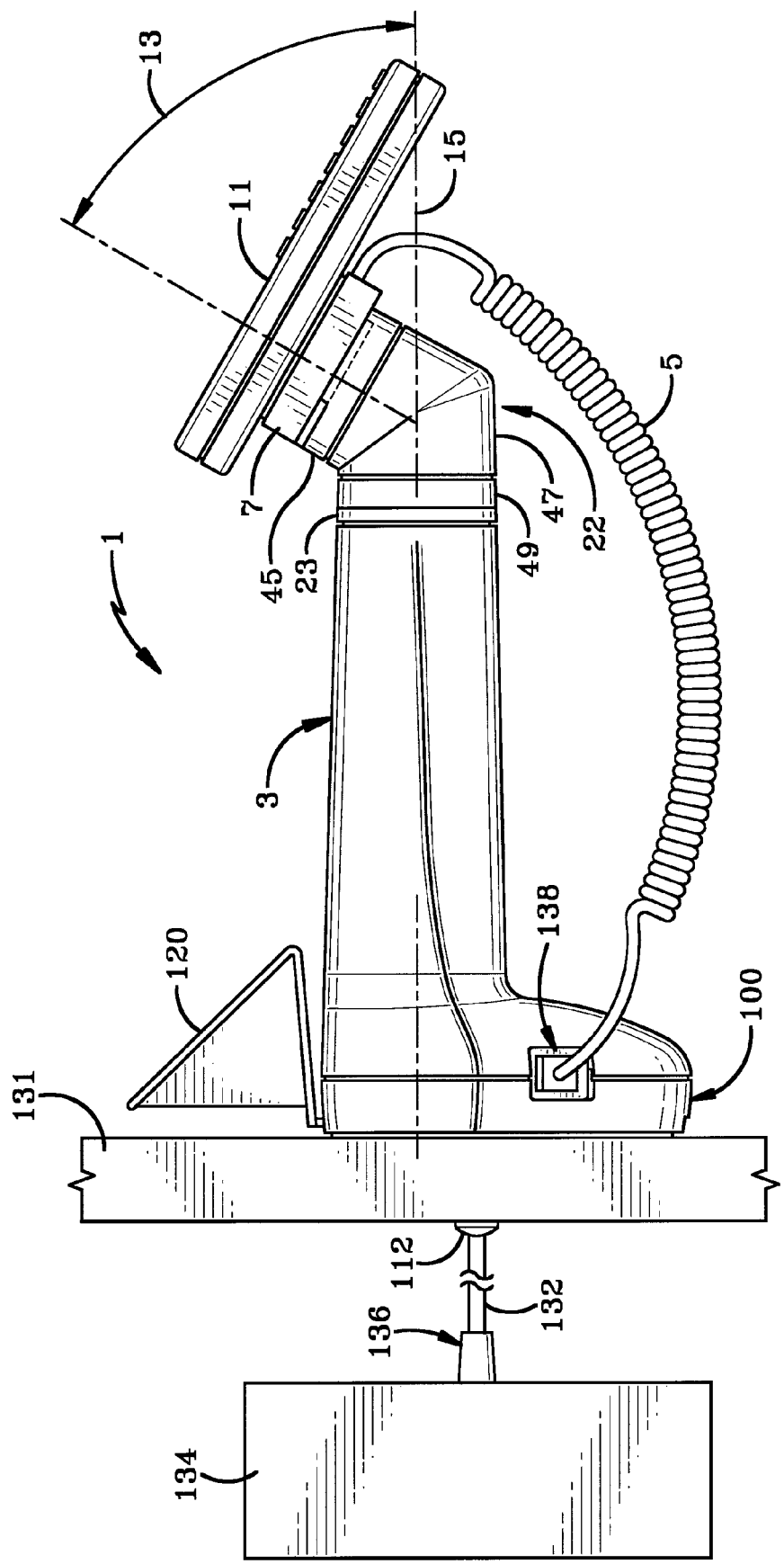
FIG. 11 illustrates a view of a horizontally mounted display assembly with interchangeable head devices.

The base 3 is shown in FIG. 1 in a generally vertical position. However, the base 3 also may be mounted in a substantially horizontal position as shown in FIG. 11 and discussed below with reference to embodiments 3 and 4. For example, the base 3 may be horizontally attached to a wall. When the base 3 is mounted horizontal, a different interchangeable head device 9 may be interchangeably attached to the base 3 to ensure that the display item 11 is presented to consumers at a proper angle.

Figure 4A:
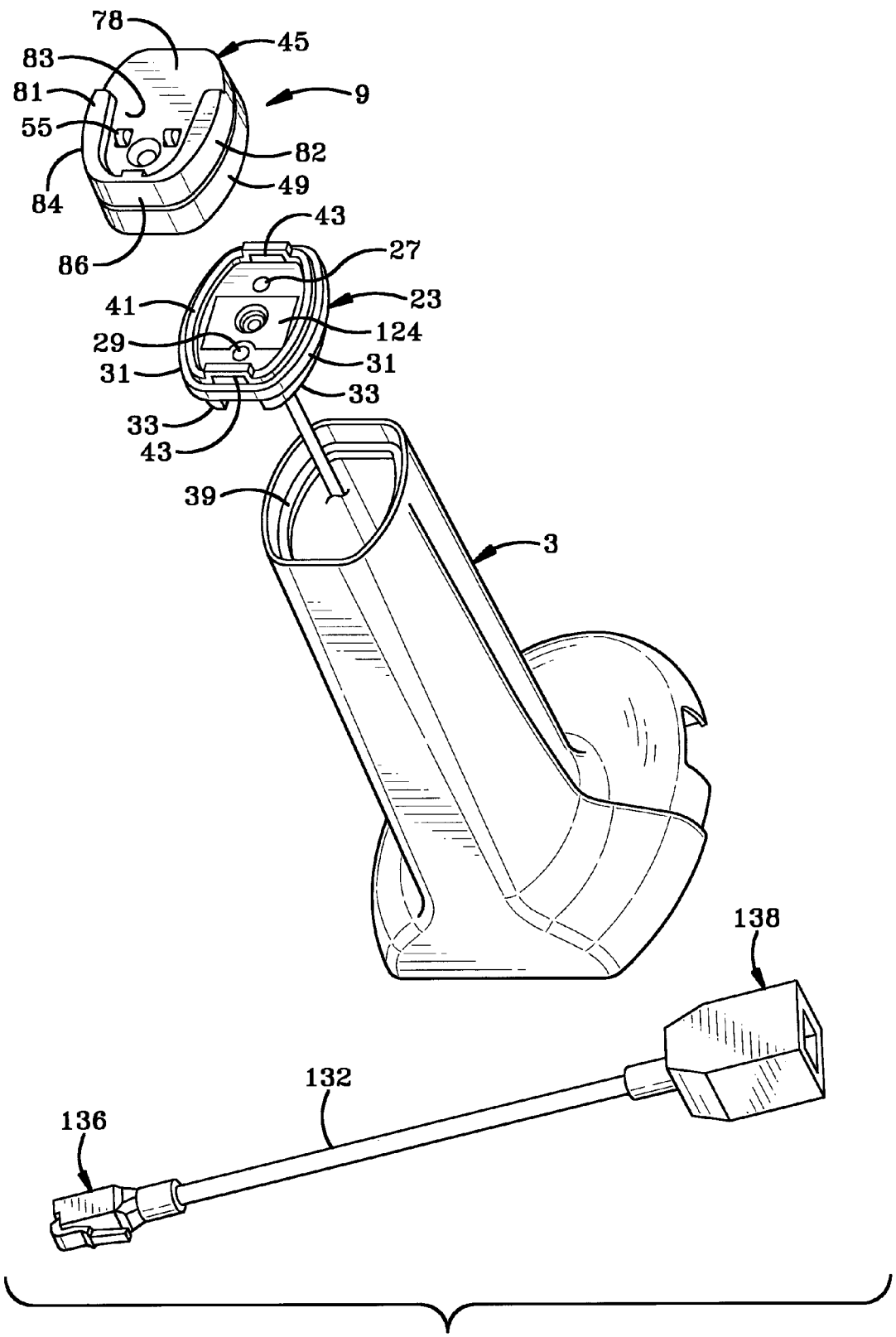
FIGS. 4A-4B illustrate exploded views of a display assembly with interchangeable head devices.

As shown in FIGS. 1-3, the base 3 of the first embodiment includes a top member 23. The top member 23 is mounted to the base 3 and the interchangeable head device 9 is mounted to the top member 23. The top member 23 is symmetrical as shown in FIG. 4A. An interchangeable head device 9 may be rotated 180 degrees and still be mounted onto the top member 23. Additionally, the top member 23 may be rotated 180 degrees around a centerline 15 of the base 3 and still be mounted onto the base 3. The top member 23 is formed with a first opening 27 and a second opening 29. When the base 3 is mounted in a substantially horizontal position, a fastening device (e.g., screw 21) is passed through the first opening 27 in the top member 23. The fastening device attaches the interchangeable head device 9 to the top member 23. When the base 3 is mounted in a substantially vertical position, the fastening device is passed through the second opening 29 in the top member 23.

As shown in FIG. 4A, the top member 23 may be formed with an outer wall 31 that encircles the top member 23. One or more lower recessed walls 33 are recessed in from the outer wall 31. The lower recessed walls 33 may aid to guide the top member 23 onto the base 3 when the top member 23 is mounted to the base 3 because the lower recessed walls 33 fit inside a top opening 37 of the base 3. When the top member 23 is mounted onto the base 3, the lower recessed walls 33 may be in contact with a ridge 39 inside the base 3. The top member 23 may contain upper recessed walls 41 that are recessed in from the outer wall 31 and aid in mounting the interchangeable head device 9 onto the top member 23. One or more tab openings 43 may be formed in the upper recessed walls 41. Tabs (not shown) in the interchangeable head device 9 may snap into the tab openings 43 when the interchangeable head device 9 is mounted in contact with the top member 23.

The tether 5 may provide physical security for the display item 11. For example, in the first embodiment, physically security is provided by physically attaching one end of the tether 5 to the mounting member 7 and the other end of the tether 5 to the base 3. Electrical wires in the one end of the tether 5 can be electrically connected to the alarm system 134 external to the display assembly 1. When the tether 5 is cut, a signal may be transmitted (e.g., a loss of voltage in the tether 5) to the alarm system 134 indicating that the tether 5 has been cut.

The interchangeable head device 9 may be comprised of a cap top 45 and a cap bottom 49. The cap top 45 is adapted to receive thereon the mounting member 7. The cap top 45 is mounted to the cap bottom 49. The cap bottom 49 is mounted to the top member 23 of the base 3. A screw 21 (shown in FIGS. 7 and 8) can be passed through openings in the cap top 45 and cap bottom 49 and then screwed into a thread assembly 65 in the top member 23.

A label display 120 may be attached to the bottom portion 100. The label display 120 can be used to display information about the display item 11 such as price, a description of the display item 11, as well as other information.

As shown in FIG. 4A and FIG. 1, a cable 132 with a first connector 136 and a second connector 138 may be used to electrically connect a bottom portion 100 of the base 3 to the alarm system 134. The second connector 138 may be connected to the bottom portion 100 and the first connector 136 may be connected to the alarm system 134. The first connector 136 and the second connector 138 may be modular types of connectors or other suitable connectors.

Figure 4B:
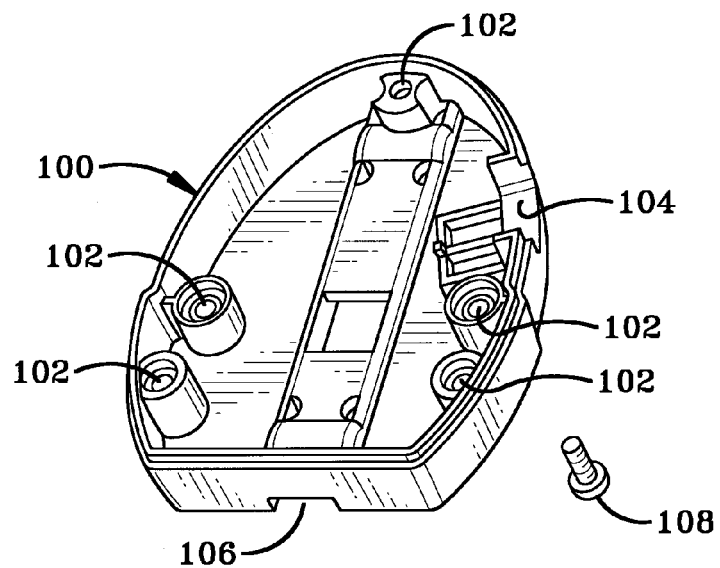
Figure 4B:
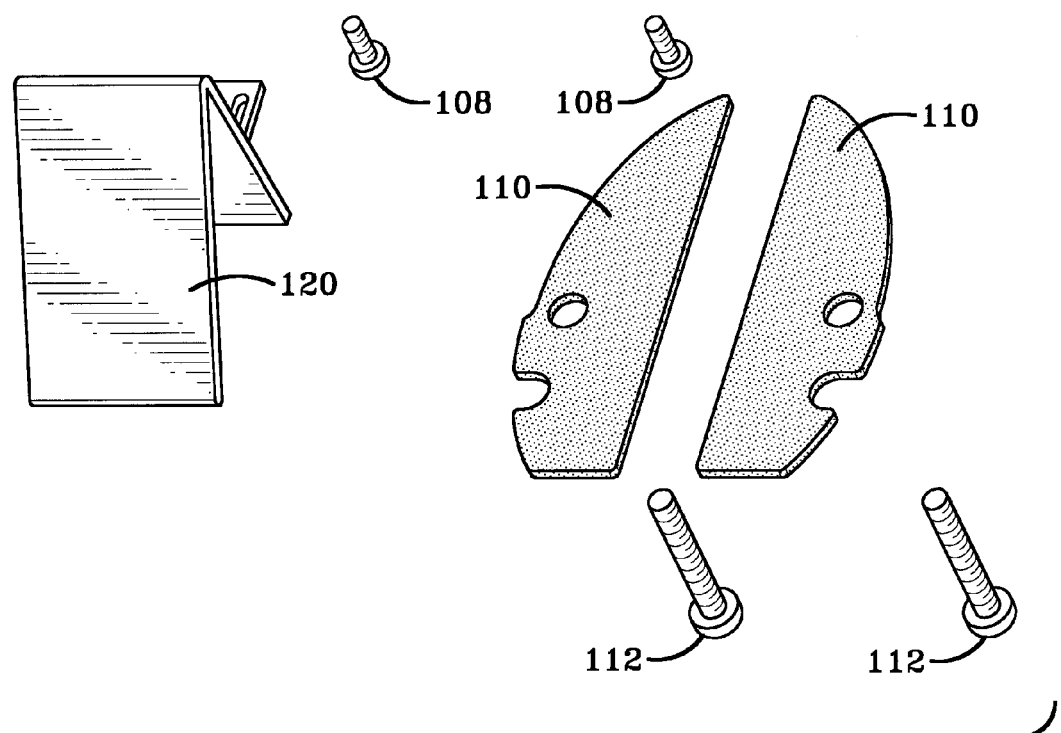

As shown in FIG. 4B, the base 3 is formed with one or more opening(s) 102 that may be threaded openings configured to receive a screw. Another opening 104 may be provided to receive a connector attached to one end of the tether 5. The bottom portion 100 may be attached to the base 3 with one or more screws 108. Additionally and/or alternatively, strips adhesive pads 110 may be used to attach the base 3 to the surface 130 of a display case or a wall. The bottom portion 100 may be attached to the base 3 by other ways as understood by those of ordinary skill in the art. The base assembly may be bolted to a display surface 130 using screws 112 (e.g., bolts) that may extend into the bottom portion 100.

Figure 5:
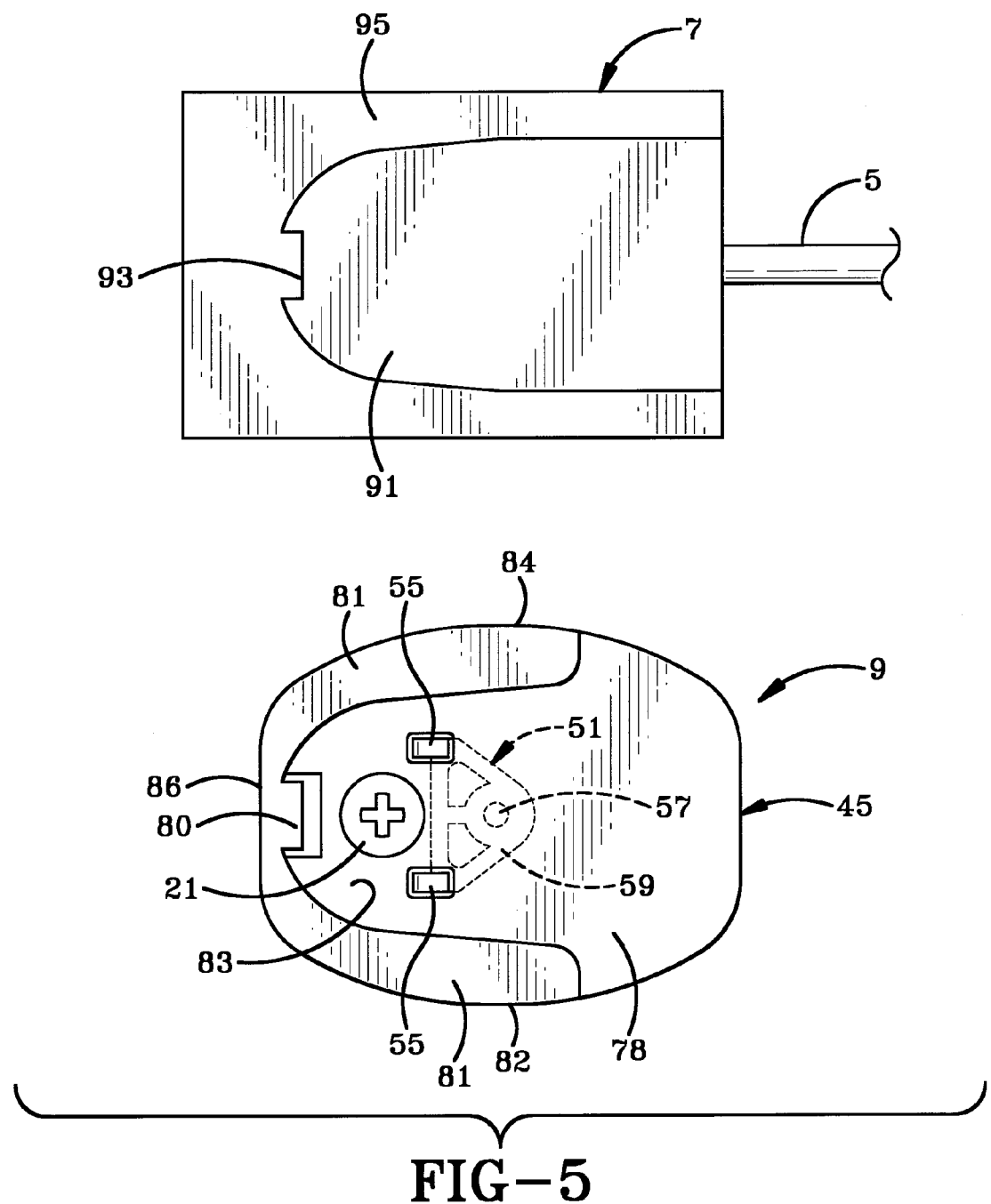
FIG. 5 illustrates one embodiment of an interchangeable head device and a mounting member.

In the first embodiment, the mounting member 7 and the cap top 45 may be shaped as shown in FIG. 5. The mounting member 7 and the cap top 45 are shaped so that the cap top 45 fits in mounting member 7 when the mounting member 7 is in contact with the cap top 45. The mounting member 7 includes a protruding portion 91 that extends away from a base portion 95. The protruding potion 91 contains a notch 93. The cap top 45 includes a relatively flat body portion 78 with the upper plunger arms 55 extending out from holes in the body portion 78. The screw 21 is recessed into the body portion 78.

Figure 7:
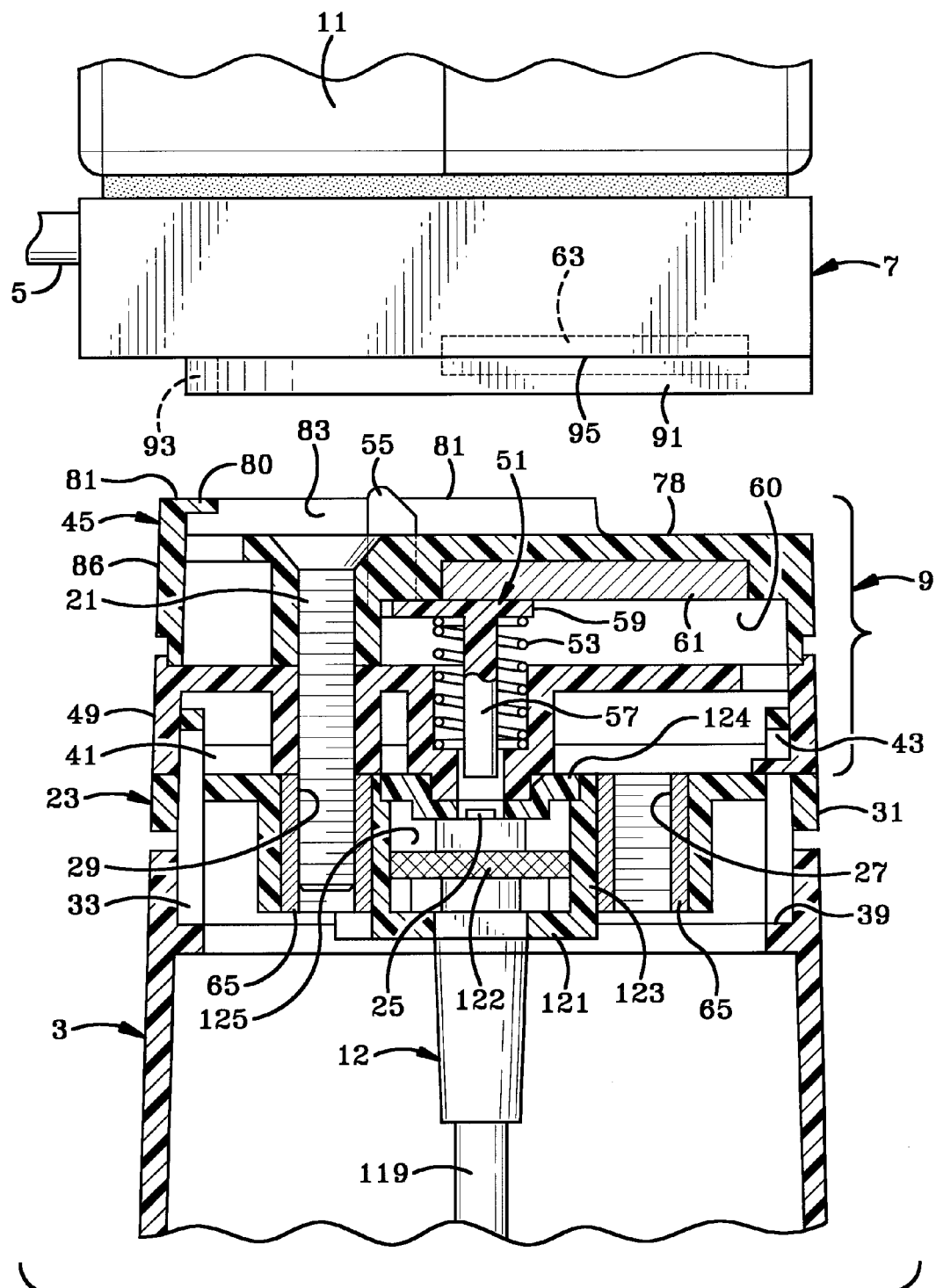
FIG. 7 illustrates a view of a first embodiment of an interchangeable head device.

The cap top 45 is formed with an elevated cap portion 81 extending outward from the flat body portion 78. The elevated cap portion 81 is generally continuous and is formed with a first elevated side portion 82, a second elevated side portion 84, and an elevated front portion 86. A front tab 80 extends outward from the elevated front portion 86. The front tab 80 rests in the notch 93 of the mounting member 7 when the mounting member 7 rests in the cap top 45. A sensor is mounted in the top member 23 as shown in FIG. 7. The sensor 12 may have a pin 25 positioned in the sensor 12. The pin 25 extends out of an opening of the sensor 12. A spring 53 is located between the cap top 45 and the cap bottom 49 and is configured to bias the plunger 51 way from the pin 25.

Figure 6:
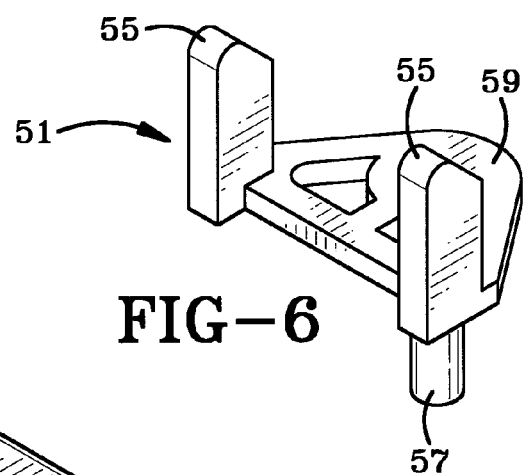
FIG. 6 illustrates a plunger associated with interchangeable head devices.

FIG. 7 shows the plunger 51 biased away from the pin 25. FIG. 6 shows the plunger 51 formed with two upper plunger arms 55, a lower plunger device 57, and a plunger body 59.

Figure 8:
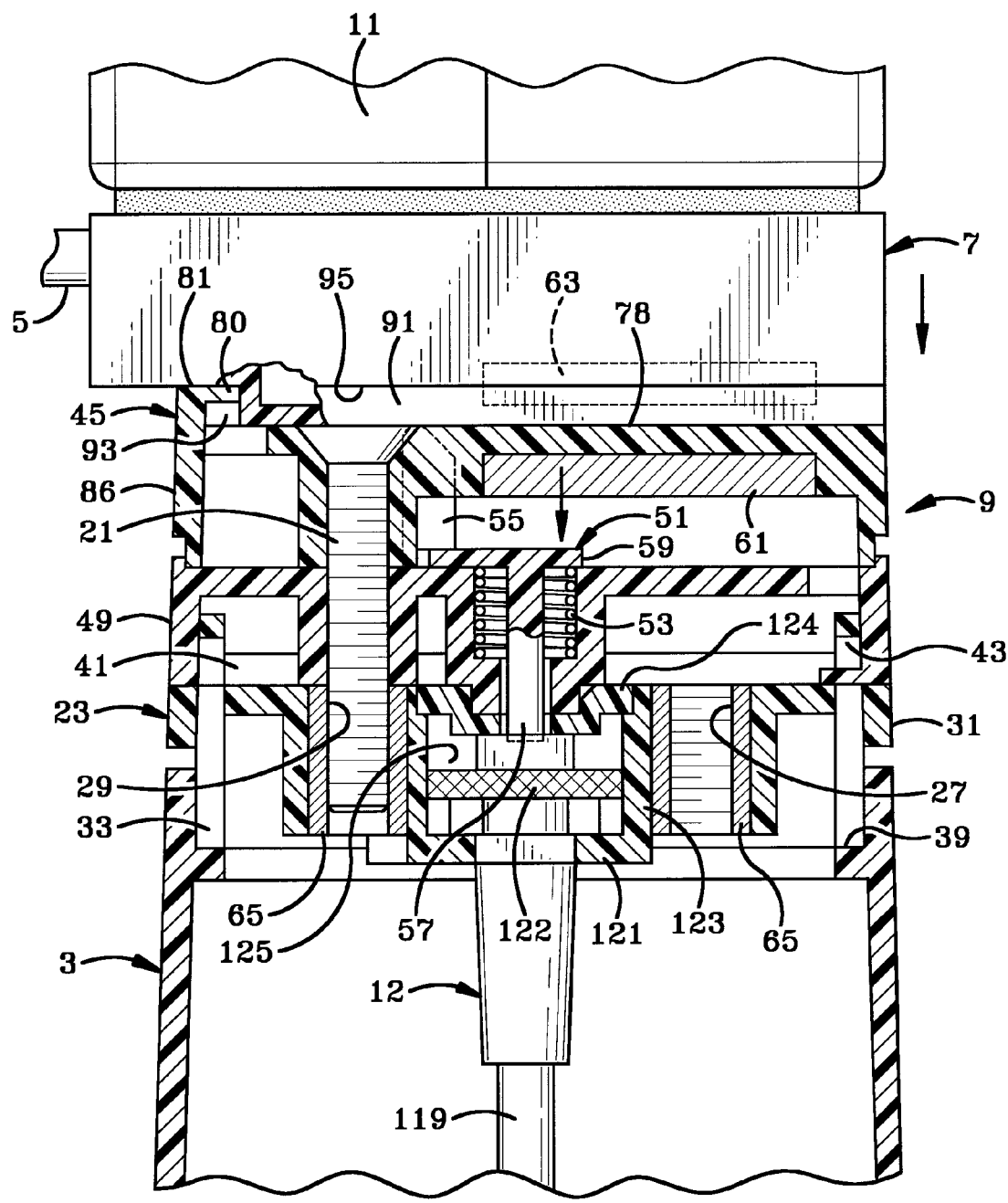
FIG. 8 illustrates a view of the first embodiment an interchangeable head device in contact with a mounting member.

The interchangeable head device 9 of the first embodiment is configured to be easily removed from the base 3 and replaced with an interchangeable head device 9 of another embodiment. The interchangeable head device 9 is installed onto the base 3 using a single screw 21 as shown in FIGS. 7 and 8. A single plunger 51 extends from the cap bottom 49 and through the cap top 45.

FIG. 8 shows the upper plunger arms 55 depressed by the mounting member 7 when the mounting member 7 is in contact with the upper plunger arms 55. When a bias force of the spring 53 is overcome, the upper plunger arms 55 are depressed. This causes the plunger body 59 and lower plunger device 57 to be depressed in a cavity 60 of the cap top 45. The depressed lower plunger device 57 will press down on the pin 25 located in the sensor 12.

The top of the base 3 may be open. The sensor 12 may extend through this opening and be mounted in the top member 23. A combination of side wall(s) 123, a top wall 124, and a bottom wall 121 may be formed in the top member 23 to create a chamber opening 125. A circuit board 122 may be mounted in the chamber opening 125 and electrically connected to the sensor 12. The sensor 12 may pass through opening(s) 125 in bottom wall 121, top wall 124, and circuit board 122. The pin 25 is extended from the sensor 12 into an opening in the top wall 124 that at least partially forms a top wall of the top member 23. Other walls and chambers may be formed in the cap top 45, cap bottom 49, and top member 23 as understood by those of ordinary skill in the art to allow these components be interchangeable with other components and to provide the desired functionality.

The sensor 12 in the base 7 may be configured to detect when the display item 11 and the mounting member 7 combination has been removed from the top member 25. The sensor 12 may provide this information to the circuit board 122. The circuit board 122 may analyze how long the sensor 12 detects that the pin 25 is not depressed by the mounting member 7 and/or how often the pin 25 is not depressed. The circuit board 122 may collect or analyze other information. The circuit board 122 can generate a signal to transmit to the external alarm system 134 based on the collected and/or analyzed information. Based on this signal, the alarm system 134 can sound alarms or take other appropriate security measures as understood by those of ordinary skill in the art.

A pair of magnets 61, 63 is used to create an attractive force to attract the mounting member 7 to the cap top 45 when the mounting member 7 is brought near the cap top 45. One magnet 61 is positioned in the cap top 45 and another magnet 63 is positioned in the mounting member 7. An adequate attractive force is created by selecting properly sized magnets 61, 63.

Figure 9:
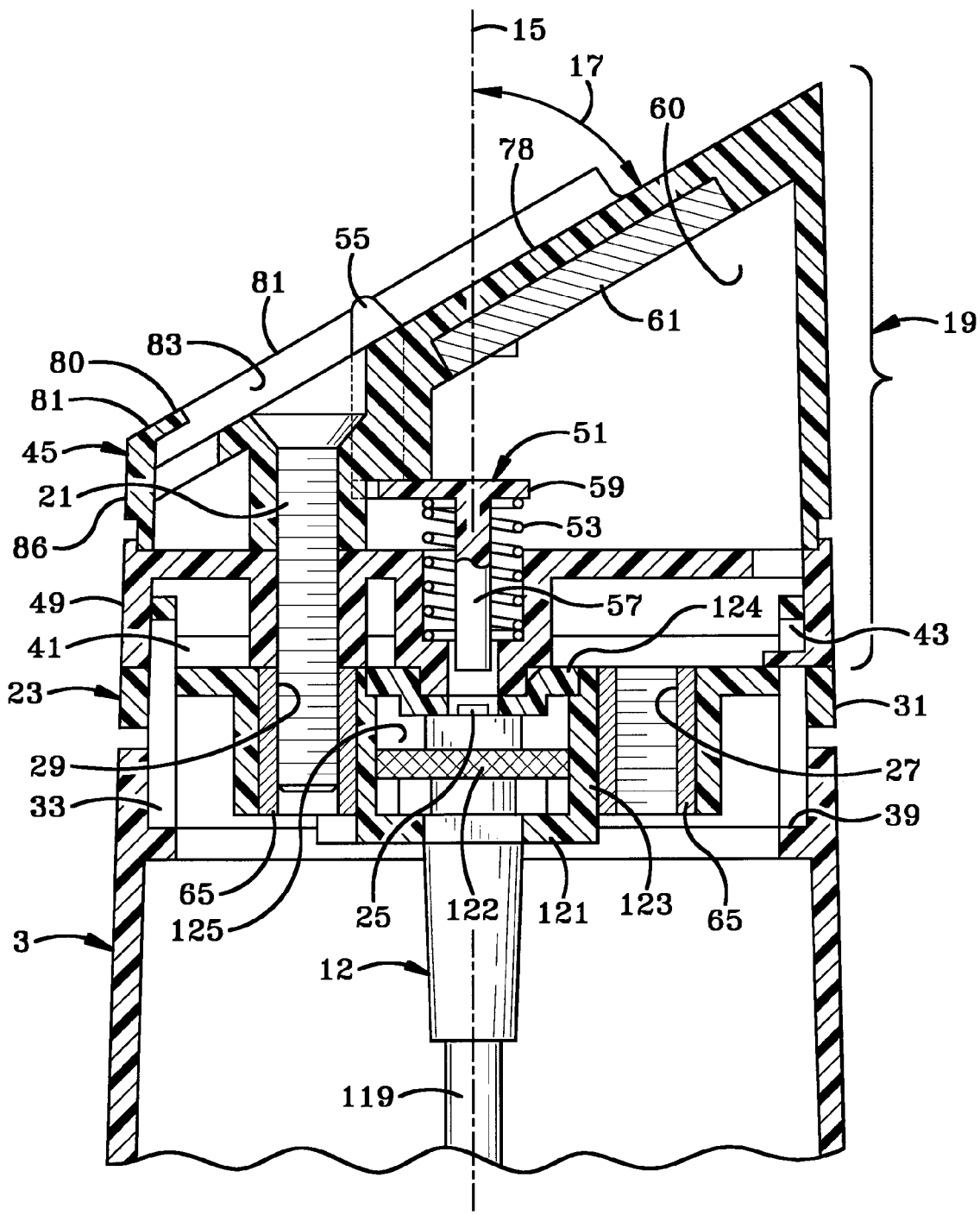
FIG. 9 illustrates a view of a second embodiment of an interchangeable head device.
Figure 10:
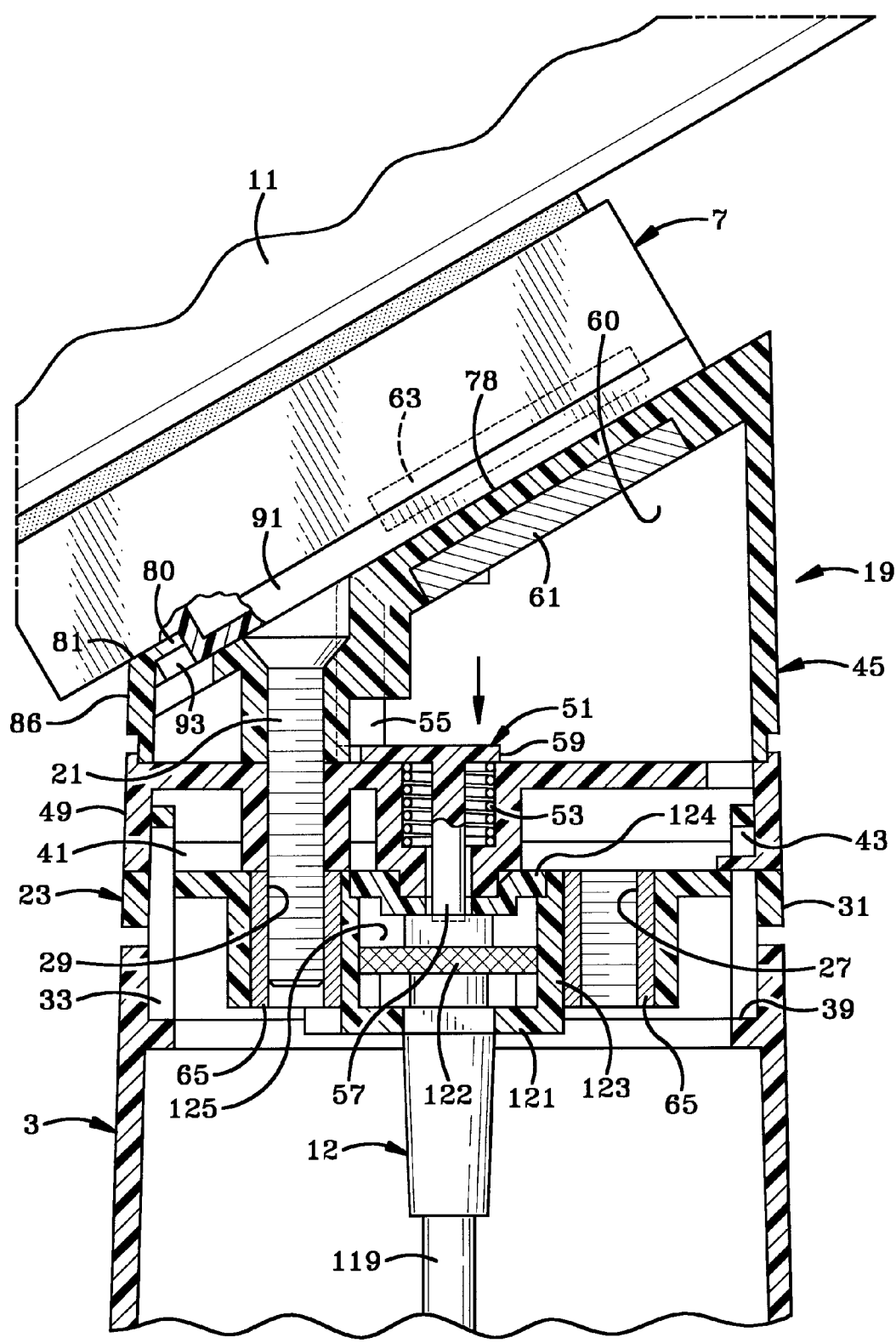
FIG. 10 illustrates a view of the second embodiment of an interchangeable head device in contact with a mounting member.

FIGS. 9 and 10 illustrate a second embodiment with an interchangeable head device 19 that is a slanted base head with the slanted top body portion 78. The interchangeable head device 19 of the second embodiment may be interchangeably attached to the top member 23 of the first embodiment. When the base 3 is installed vertically, the slanted base head 19 is configured to position the mounting member 7 to cause the display assembly 1 to display the display item 11 at an oblique angle 17 with respect to the centerline 15 of the base 3. The cap bottom 49, top member 23, and base 3 are the same as in the first embodiment shown in FIGS. 7-8.

A plunger 51 depresses the pin 25 when the mounting member 7 depresses the upper plunger arm(s) 55. The upper plunger arm(s) 55 of the second embodiment shown in FIGS. 9-10 are similar to upper plunger arm(s) 55 of the first embodiment shown FIGS. 7-8. However, upper plunger arm(s) 55 of the second embodiment may be longer than upper plunger arm(s) 55 the first embodiment because the cap top 45 of the second embodiment is slanted and therefore, longer than a non-slanted interchangeable head device 9 of the first embodiment. FIG. 9 shows the display assembly 1 without the mounting member 7 of the second embodiment in contact with the interchangeable head device 19. In FIG. 10 the mounting member 7 is in contact with the interchangeable head device 19.

FIG. 11 illustrates a third embodiment with the display assembly 1 mounted horizontally to a vertical surface such as a wall. In FIG. 11 the display item 11 is illustrated as a calculator. Components that are similar to components discussed earlier are labeled with the same reference label. A horizontally mounted display assembly 1 generally has an interchangeable head device 22 that is rotated at a greater angle 13 from the centerline 15 than a vertically mounted display assembly 1. To create this greater angle 13, the interchangeable head device 22 includes a cap housing 47. The cap housing 47 contains two (or more) plungers to compensate for the angle 13 to depress the pin 25 when the mounting member 7 is in contact with the interchangeable head device 22. The interchangeable head device 22 of the third embodiment may be interchangeably attached to the top member 23 of the first embodiment or the second embodiment.

Figure 14:
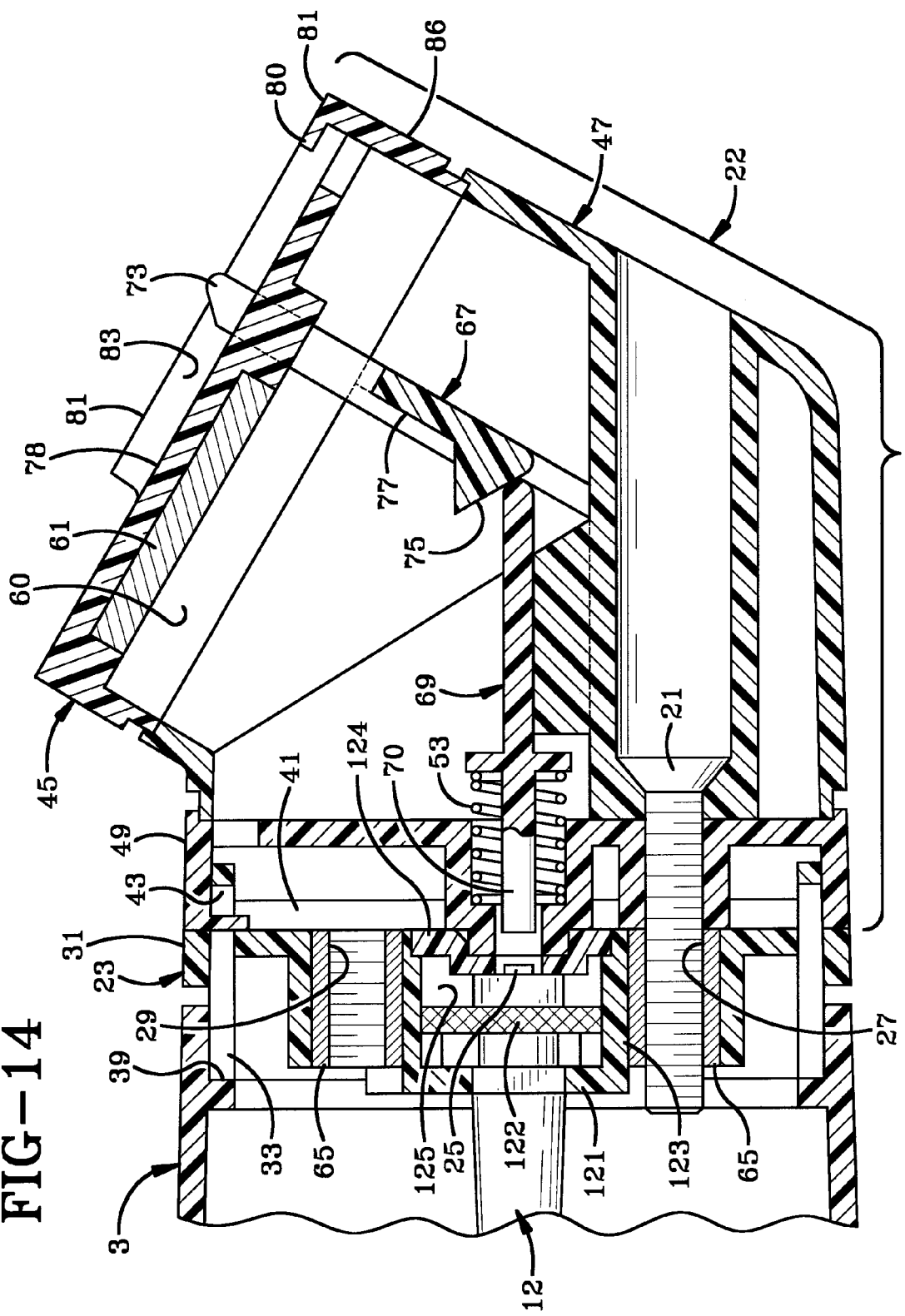
FIG. 14 illustrates a view of a third embodiment of an interchangeable head device.

FIG. 14 illustrates an interchangeable head device 22 of the third embodiment that is mounted as a horizontal display assembly 1. The cap top 45, cap bottom 49, member 23, and base 3 are similar to the components of the vertically mounted first and second embodiments discussed above. The interchangeable head device 22 of the third embodiment further includes the cap housing 47. The cap housing 47 is mounted between the cap top 45 and the cap bottom 49. The cap housing 47 is needed because the interchangeable head device 22 causes the display item 11 to be displayed at a large enough angle 13 so that more than one plunger is needed to depress the pin 25.

Figure 15:
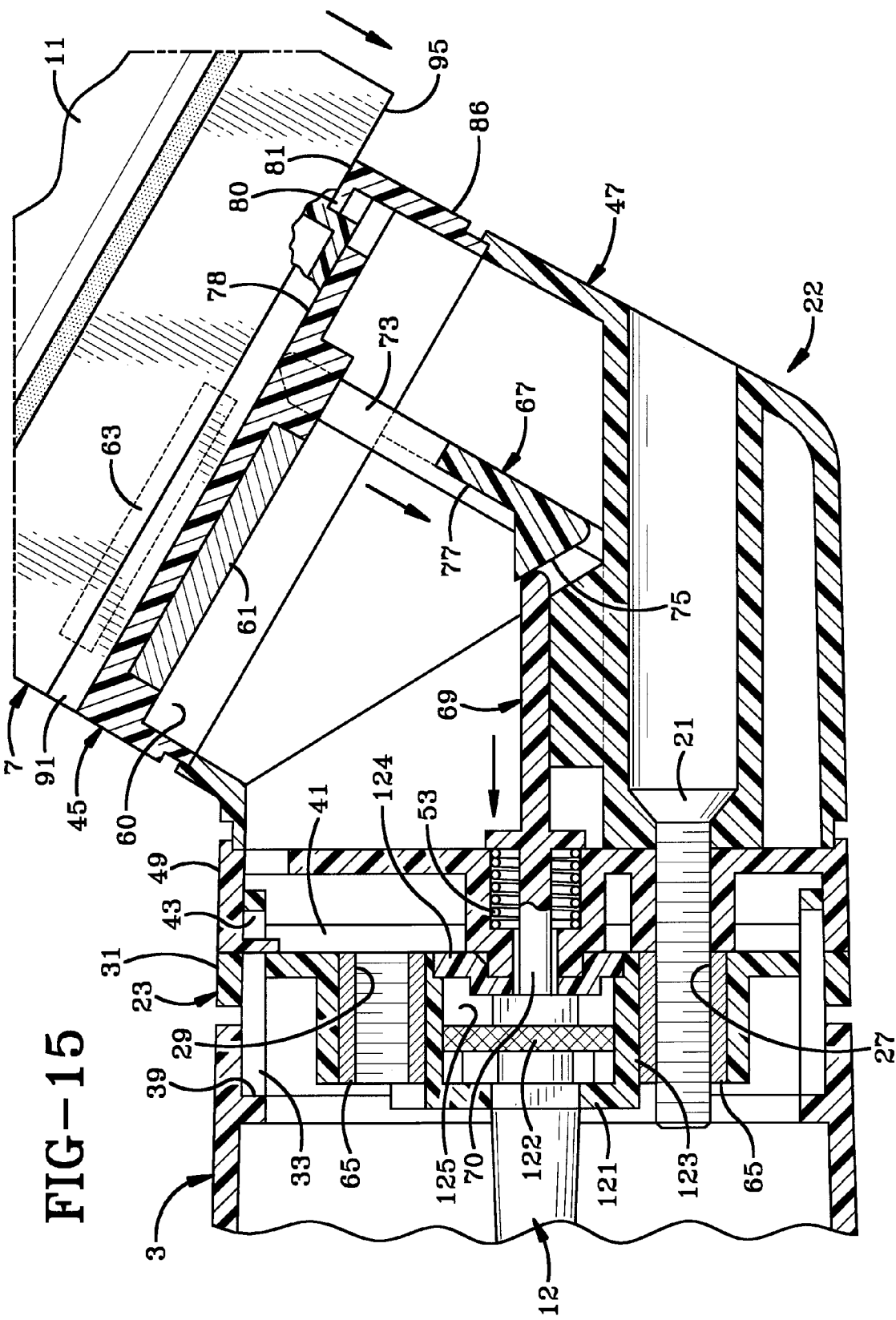
FIG. 15 illustrates a view of the third embodiment of an interchangeable head device in contact with a mounting member.

The cap housing 47 is configured with two plungers arranged in series (e.g., a chain). These plungers are configured to depress the pin 25 when the mounting member 7 is in contact with the cap top 45. The plunger action is provided by a first plunger 67 and a second plunger 69. The plungers 67, 69 are biased away from the pin 25 by the spring 53 when the mounting member 7 is not in contact with the interchangeable head device 22. When the mounting member 7 is in contact with the interchangeable head device 22, the second plunger 69 is pressed toward the first plunger 67 by the mounting member 7. The second plunger 69 is in turn pressed toward the pin 25 and depresses the pin 25. FIG. 15 shows example positions of the plungers 67, 69 when the mounting member 7 is in contact with the interchangeable head device 22.

Figure 12:
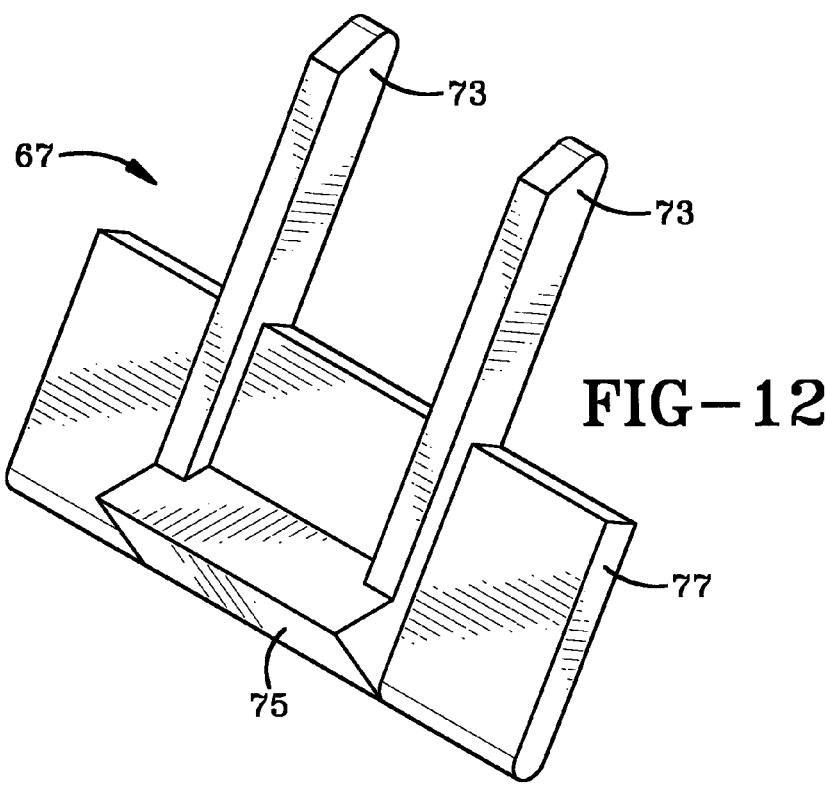
FIG. 12 illustrates another plunger associated with interchangeable head devices.

FIG. 12 illustrates an example first plunger 67. The first plunger 67 includes two upper arms 73 that extend through the cap top 45 where they can be depressed by the mounting member 7. A beveled portion 75 of the first plunger 67 is configured to provide additional surface area to contact the second plunger 69. A body portion 77 may give the first plunger 67 some rigidity and is generally planer in shape. Two opposite straight sides of the body portion 77 may slide in channels formed in the cap housing 47.

Figure 13:
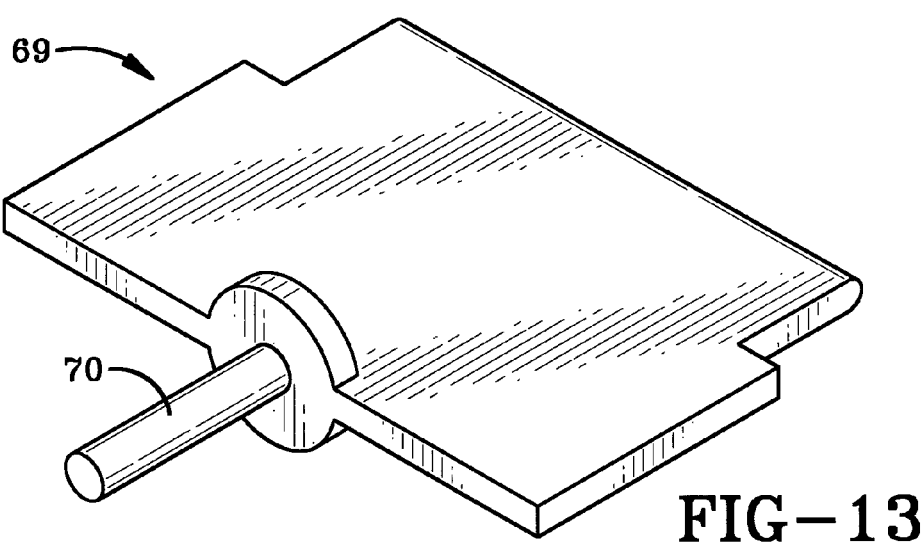
FIG. 13 illustrates another plunger associated with interchangeable head devices.

FIG. 13 illustrates an example second plunger 69. The second plunger 69 is formed with a circular rod 70 that is configured to pass through a hole in the cap bottom 49 to depress the pin 25. The rod 70 may be circular in shape. The second plunger 69 may be formed with a flat body upon which the rod 70 is attached. Similar to the first plunger 67, two opposite straight sides of the flat body may slide in channels formed in the cap housing 47.

Figure 16:
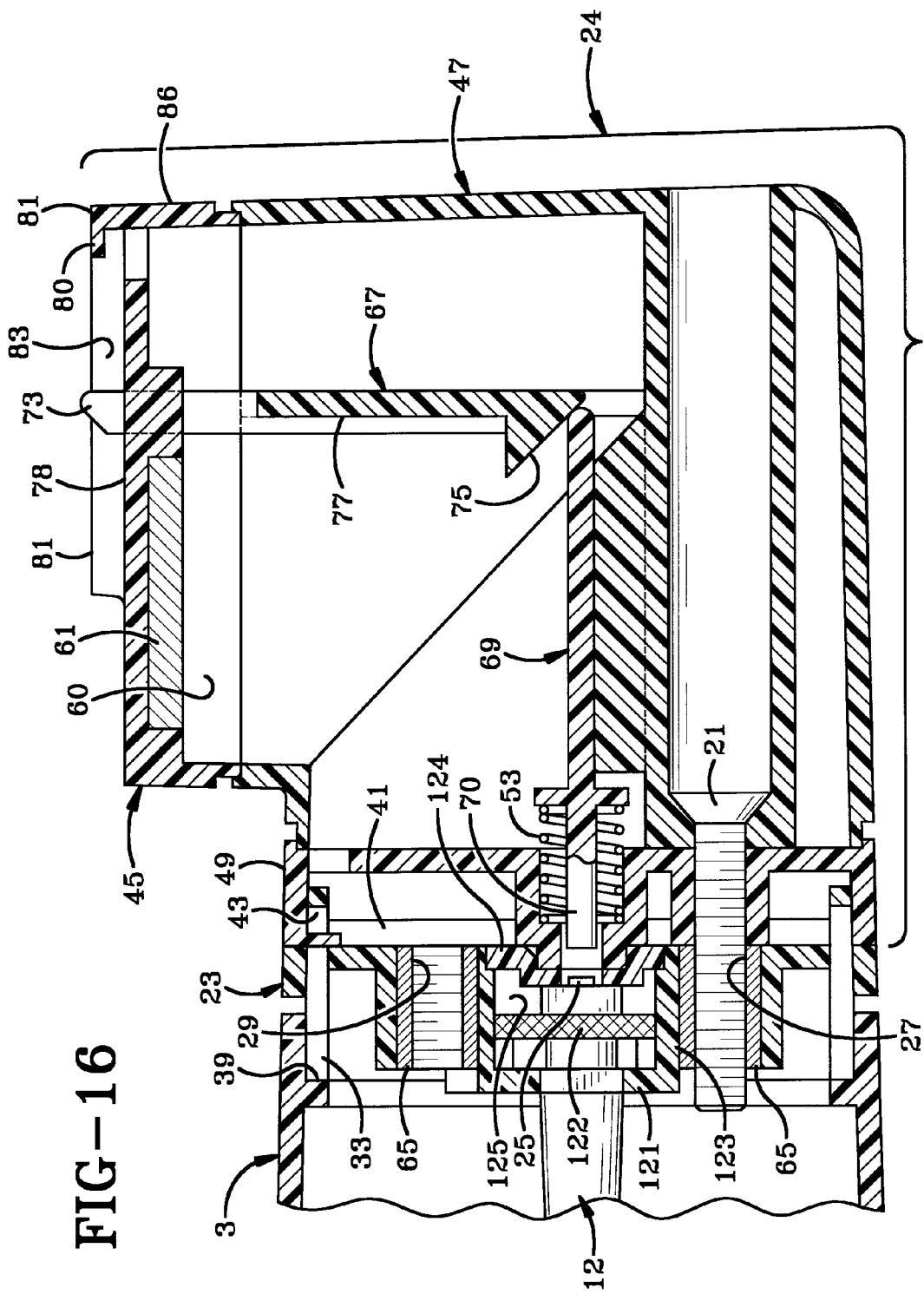
FIG. 16 illustrates a view of a fourth embodiment of an interchangeable head device.
Figure 17:
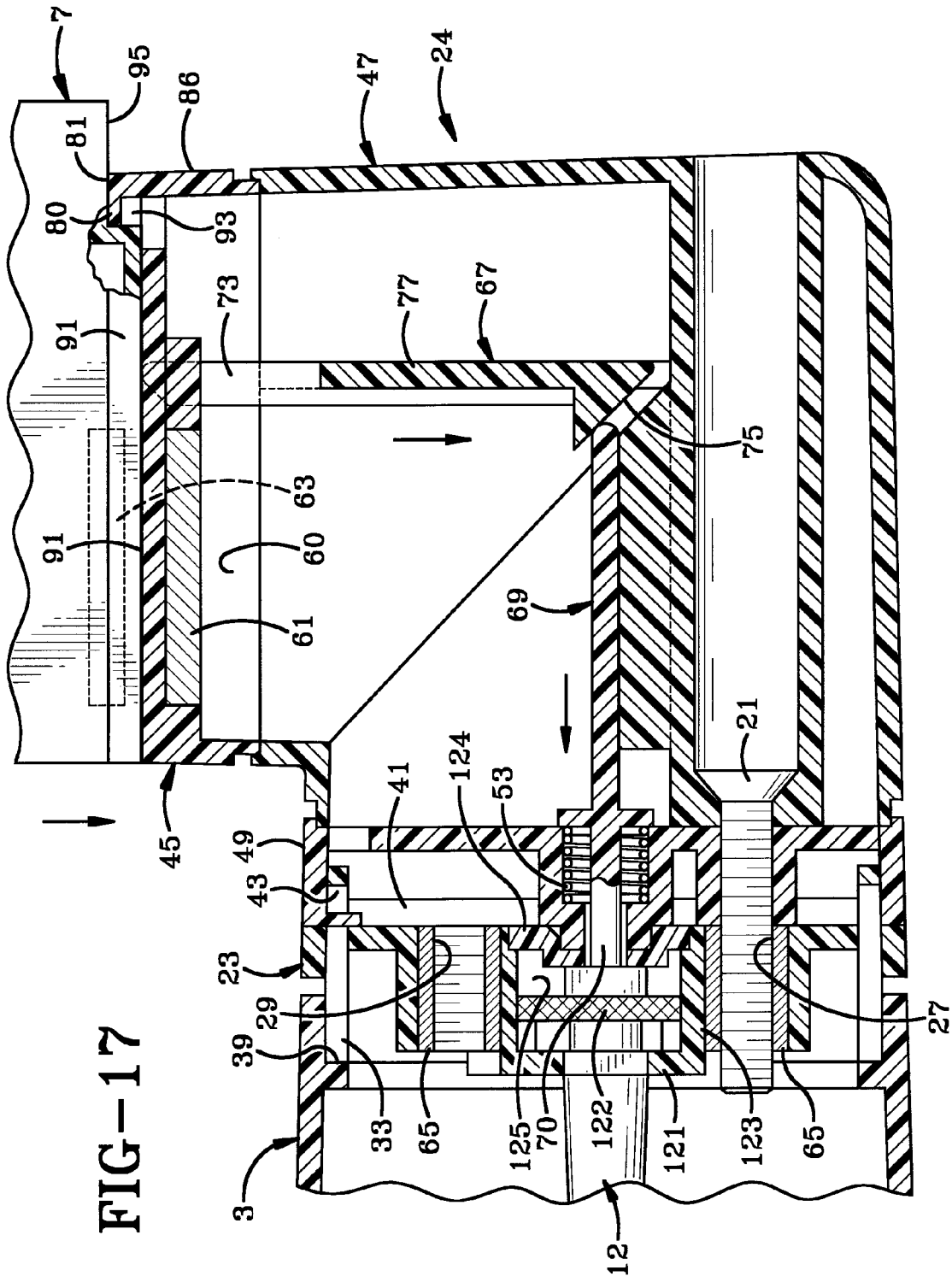
FIG. 17 illustrates a view of the fourth embodiment of an interchangeable head device in contact with a mounting member.

FIGS. 16 and 17 illustrate a fourth embodiment of an interchangeable head device 24 that causes the mounting member 7 to display the display item 11 at a 90 degree angle with respect to the centerline 15 of the base 3. The interchangeable head device 24 of the forth embodiment may be interchangeably attached to the top member 23 of the first, second, or third embodiments. Components that are similar to components discussed earlier are labeled with the same reference label. The first plunger 67 and the second plunger 69 are similar the first plunger 67 and the second plunger 69 discussed above. However, the length of some portions of the first plunger 67 and the second plunger 69 of the fourth embodiment may be longer that the third embodiment.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 18:
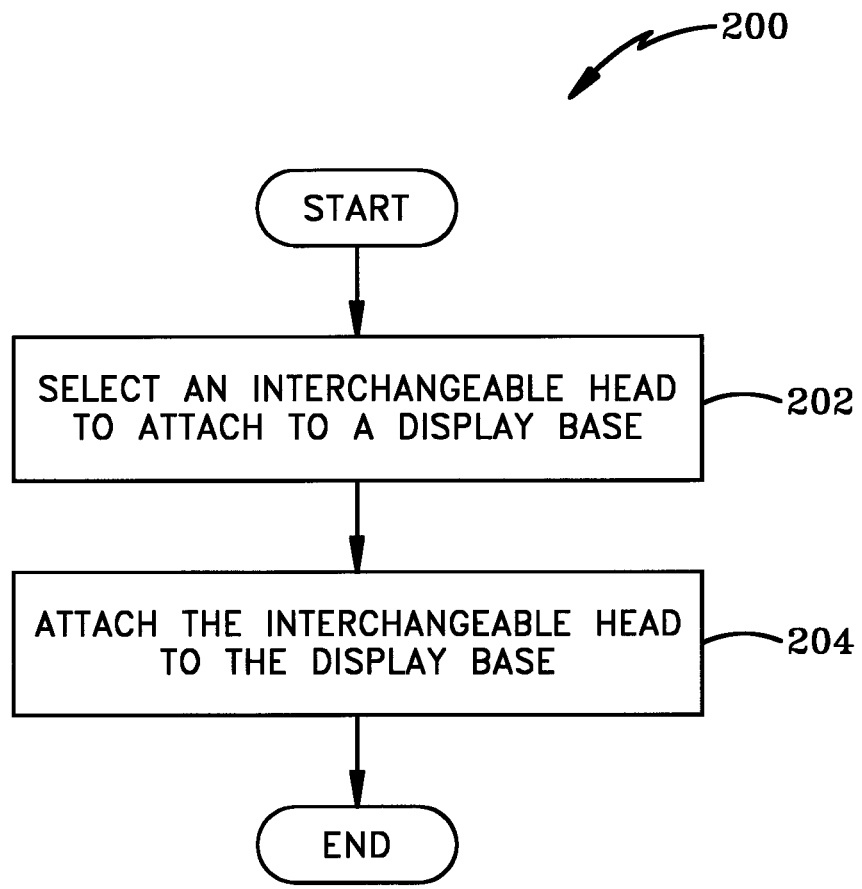
FIG. 18 illustrates one embodiment of a method associated with a display assembly with interchangeable head devices.

FIG. 18 illustrates an embodiment of a method 200 associated with mounting a merchandise display apparatus. The method 200 allows the merchandise display apparatus to display a merchandise item in a way that allows a customer to pick up the merchandise item from the merchandise display apparatus. The customer may view, rotate, and explore the merchandise item to determine if the customer wants to purchase the item. The method 200 allows for different interchangeable heads to be mounted onto a base to display the merchandise item at different angles depending on whether the base is mounted in a horizontal or vertical position.

The method 200 begins by selecting an interchangeable head to attach to a display base at 202. The interchangeable head is selected from a group of interchangeable heads. The interchangeable heads are adapted to receive a mounting member adapted for mounting thereon a display item. The mounting member is movable between a mounted position in contact with the selected interchangeable head. The mounting member can be removed from the selected interchangeable head to facilitate viewing and handling, of the display item.

The selected interchangeable head is attached to the display base at 204. The selected interchangeable head may be attached to the display base by screwing the head to the base with one or more screws, bolts, or other fastening device. The interchangeable head may be attached to the display base by snapping the head onto the base with snapping devices formed into the head and base.

In another embodiment, the base may be mounted in a substantially horizontal position or a substantially vertical position. The selected interchangeable head is selected based, at least in part, on whether the base is mounted in the substantially horizontal position or the substantially vertical position.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The invention claimed is:

1. A display assembly comprising:
a base;
an interchangeable base head device mounted to the base, wherein the interchangeable base head device is one of a plurality of different base head devices configured to be interchangeably mounted to the base;
a mounting member adapted for mounting thereon a display item, wherein the mounting member is movable between a mounted position in contact with the interchangeable base head device mounted to the base and a removed position wherein the mounting member is positioned away from the interchangeable base head device mounted to the base to facilitate viewing and handling of the display item;
a tether attached to the mounting member;
a sensor adapted to transmit a signal to an alarm system when the mounting member is removed from the interchangeable base head device mounted to the base; a first interchangeable base head device in the plurality of different base head devices;
a second interchangeable base head device in the plurality of different base head devices;
wherein the first interchangeable base head device causes the mounting member to display the display item with a first angle and the second interchangeable base head device causes the mounting member to display the display item with a second angle different than the first angle.

2. The display assembly of claim 1, wherein the base is adapted to be mounted in a substantially vertical direction or a substantially horizontal direction.

3. The display assembly of claim 1, further comprising:
a centerline of the base; and
wherein at least one of the first and second interchangeable base head devices is configured to position the mounting member to cause the display item to be displayed at an oblique angle with respect to the centerline of the base.

4. The display assembly of claim 1, wherein the base includes:
a top member; and
wherein the sensor is mounted in the top member, and wherein the top member is mounted to the base and the interchangeable base head device mounted to the base is mounted to the top member.

5. The display assembly of claim 4, further comprising:
a fastening device; and
wherein when the base is mounted in a substantially horizontal position the fastening device is passed through a first hole in the top member, wherein when the base is mounted in a substantially vertical position the fastening device is passed through a second hole in the top member, and wherein the fastening device is configured to attach the interchangeable base head device mounted to the base to the top member.

6. The display assembly of claim 1, further comprising:
a pin positioned in the sensor; and wherein the pin is configured to be depressed when the mounting member is in contact with the interchangeable base head device mounted to the base, and wherein the sensor is adapted to transmit the signal to the alarm system when the pin is not depressed.

7. The display assembly of claim 1, further comprising:
a centerline of the base;
a plunger forming part of the interchangeable base head device mounted to the base;
a pin forming part of the sensor; and
wherein the interchangeable base head device mounted to the base is adapted to position the mounting member to cause the display item to be displayed at an oblique angle with respect to the centerline, wherein the plunger is adapted to cause the pin to be depressed when the mounting member is in contact with the interchangeable base head device mounted to the base, and wherein the sensor is adapted to transmit the signal to the alarm system when the pin is not depressed.

8. The display assembly of claim 7 wherein the plunger is configured to slide in a pair of grooves in the interchangeable base head device mounted to the base.

9. The display assembly of claim 1, wherein the interchangeable base head device mounted to the base is adapted to be mounted on the base in an original position and in a second position, and wherein the interchangeable base head device mounted to the base is rotated substantially 180 degrees between the original position and the second position.

10. The display assembly of claim 1, further comprising:
a centerline of the base;
a plurality of plungers mounted in the interchangeable base head device mounted to the base;
a pin which forms part of the sensor;
wherein the interchangeable base head device mounted to the base is configured to position the mounting member to cause the display item to be displayed at an oblique angle with respect to the centerline; and
wherein the plurality of plungers is arranged in a series, wherein the plurality of plungers is adapted to cause the pin to be depressed when the mounting member is in contact with the interchangeable base head device mounted to the base, and wherein the sensor is adapted to transmit the signal to the alarm system when the pin is not depressed.

11. The display assembly of claim 1, wherein the sensor is configured to provide a signal to an external alarm external to the display assembly when the tether is cut.

12. A consumer display comprising:
a base;
a plurality of different base head devices, wherein the plurality of different base head devices are adapted configured to be interchangeably mounted to the base, wherein each of the plurality of different base head devices is comprised of:
a cap assembly; and
a top assembly;
wherein the cap assembly is mounted on the top assembly, and wherein the top assembly is mounted on the base;
wherein the cap assembly is configured to receive thereon a mounting member adapted for mounting thereon a display item, wherein the mounting member is movable between a mounted position in contact with the cap assembly and a removed position removed from the cap assembly to facilitate viewing and handling of the display item; and further comprising:
a tether configured to be attached to the mounting member;
a sensor configured to transmit a signal to a control logic when the mounting member is removed from the cap assembly;
a first interchangeable base head device in the plurality of different base head devices; and
a second interchangeable base head device in the plurality of different base head devices;
wherein the first interchangeable base head device causes the mounting member to display the display item with a first angle and the second interchangeable base head device causes the mounting member to display the display item with a second angle different than the first angle.

13. The display of claim 12, wherein the cap assembly is comprised of:
a cap top adapted to receive thereon the mounting member;
a cap housing configured with one or more plungers arranged in a chain;
a cap bottom configured with a spring to bias the one or more plungers away from a pin in the top assembly, wherein the cap housing is mounted between the cap top and the cap bottom, and wherein the cap bottom is mounted to the top assembly; and
wherein the one or more plungers are adapted to depress the pin when the mounting member is in contact with the cap top, and wherein the sensor is configured to transmit the signal when the pin is not depressed.

14. The display of claim 13, further comprising:
a centerline of the base; and
wherein the cap housing is configured to position the cap top to receive the mounting member at an oblique angle with respect to the centerline.

15. The display of claim 13, wherein the one or more plungers are substantially flat and are configured to move within grooves in the cap housing.

16. A method comprising:
providing a plurality of interchangeable heads, wherein members of the plurality of interchangeable heads are configured to receive a mounting member configured for mounting thereon a display item, wherein the mounting member is movable between a mounted position in contact with a selected interchangeable head and a removed position removed from the selected interchangeable head to facilitate viewing and handling of the display item;
selecting a first interchangeable head from the plurality of interchangeable heads;
attaching the selected first interchangeable head to a display base so that the first interchangeable head causes the mounting member to display the display item with a first angle;
selecting a second interchangeable head from the plurality of interchangeable heads; and
attaching the selected second interchangeable head to the display base so that the second interchangeable head causes the mounting member to display the display item with a second angle different than the first angle.

17. The method of claim 16, further comprising:
mounting the base in a substantially horizontal position or a substantially vertical position; and
selecting at least one of the interchangeable heads based, at least in part, on whether the base is mounted in the substantially horizontal position or the substantially vertical position.

18. The method of claim 16, wherein the attaching of the first or second interchangeable head to the base comprises snapping the first or second head onto the base.

\* \* \* \* \*